United States Patent
Dixon et al.

(10) Patent No.: US 8,856,514 B2
(45) Date of Patent: Oct. 7, 2014

(54) RENEWAL PROCESSING OF DIGITAL CERTIFICATES IN AN ASYNCHRONOUS MESSAGING ENVIRONMENT

(75) Inventors: Bret W. Dixon, South Perth (AU); Scot W. Dixon, South Perth (AU)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 13/417,888

(22) Filed: Mar. 12, 2012

(65) Prior Publication Data

US 2013/0238895 A1 Sep. 12, 2013

(51) Int. Cl.
 *H04L 29/06* (2006.01)
 *H04L 9/32* (2006.01)
 *H04N 21/835* (2011.01)
 *G06F 21/33* (2013.01)

(52) U.S. Cl.
 CPC .......... *H04L 9/3265* (2013.01); *H04L 63/0823* (2013.01); *H04N 21/835* (2013.01); *G06F 21/33* (2013.01)
 USPC ............. 713/156; 726/10; 713/157; 713/173; 713/175

(58) Field of Classification Search
 CPC .............. H04L 63/0823; H04L 9/3265; H04L 2209/38; H04N 21/835; G06F 21/33
 USPC ........................................................ 713/156
 See application file for complete search history.

(56) References Cited

U.S. PATENT DOCUMENTS

| | | | |
|---|---|---|---|
| 5,373,561 A | 12/1994 | Haber et al. | |
| 6,233,341 B1 | 5/2001 | Riggins | |
| 6,393,563 B1 | 5/2002 | Maruyama et al. | |
| 6,490,358 B1 * | 12/2002 | Geer et al. | 380/286 |
| 6,842,863 B1 | 1/2005 | Fox et al. | |
| 7,930,415 B2 | 4/2011 | Gupta et al. | |
| 2005/0076203 A1 * | 4/2005 | Thornton et al. | 713/156 |
| 2005/0114440 A1 * | 5/2005 | Waxman et al. | 709/203 |
| 2007/0033407 A1 * | 2/2007 | MacKay et al. | 713/171 |
| 2008/0168026 A1 * | 7/2008 | Patil et al. | 707/2 |
| 2008/0234047 A1 * | 9/2008 | Nguyen | 463/42 |
| 2009/0106550 A1 * | 4/2009 | Mohamed | 713/156 |
| 2010/0008500 A1 * | 1/2010 | Lisanke et al. | 380/201 |
| 2010/0115267 A1 | 5/2010 | Guo et al. | |
| 2011/0113239 A1 * | 5/2011 | Fu et al. | 713/156 |
| 2011/0126002 A1 * | 5/2011 | Fu et al. | 713/156 |

OTHER PUBLICATIONS

Web Service Security, Scenarios, Patterns and Implementation guidance for web services enhancement (WSE) 3.0, 2005, Microsoft, pp. 1-359.*
Google Patent Search.*

(Continued)

*Primary Examiner* — Arvin Eskandarnia
(74) *Attorney, Agent, or Firm* — Lee Law, PLLC; Christopher B. Lee

(57) ABSTRACT

A renewed digital certificate is obtained within an asynchronous messaging environment from a certificate server of an issuer of an existing digital certificate to replace the existing digital certificate. The renewed digital certificate includes an extended attribute that stores a serial number value of the existing digital certificate. A message is received with a symmetric key that is encrypted using the existing digital certificate. The symmetric key is identified within the message by the serial number value of the existing digital certificate. The message is processed using the renewed digital certificate.

18 Claims, 7 Drawing Sheets

(56) References Cited

OTHER PUBLICATIONS

R. Housley, et al., Internet X.509 Public Key Infrastructure Certificate and Certificate Revocation List (CRL) Profile, Apr. 2002, pp. 1-129, The Internet Society, Published at: http://www.ietf.org/rfc/rfc3280.txt.

Author Unknown, X.509 Technical Supplement, Webpage/site, Dec. 2005, pp. 1-10, Microsoft Corporation, Published at: http://msdn.microsoft.com/en-us/library/ff647097.aspx.

Von Welch, et al., X.509 Proxy Certificates for Dynamic Delegation, Proceedings of the 3rd Annual PKI R&D Workshop, 2004, pp. 1-17 (plus 2 citation pages added), Published at: http://docs.google.com/viewer?a=v&q=cache:lJLvK6TcMzgJ:citeseerx.ist.psu.edu/viewdoc/download%3Fdoi%3D10.1.1.90.4846%26rcp%3Drep1%26type%3Dpdf+digital+certificate+extension+temporary+messaging+environment+X.509&hl=en&gl=in&pid=bl&srcid=ADGEESj54D7fPVYajPeHYZd5My-ttfCshTbzqZ40VHS1oAqygNNPg1M19k00aHCbRI7ZI-pgsVXQfsSSeFLUYgVMSfGz29HLwcTqjF6m-O3QRQqBTfnFVuLU_PKyRCTqOYx3w2ME2gDI&sig=AHIEtbSmlJwEKCGjEGOHJlm-YxbIAB2xQ.

* cited by examiner ized Certificates in an Asynchronous Messaging Environment

RENEWAL PROCESSING OF DIGITAL CERTIFICATES IN AN ASYNCHRONOUS MESSAGING ENVIRONMENT

BACKGROUND

The present invention relates to digital certificate processing. More particularly, the present invention relates to renewal processing of digital certificates in an asynchronous messaging environment.

In a messaging environment that uses digital certificates to encrypt messages, a public key of recipient certificates may be used to encrypt a symmetric key used to encrypt a message. The message recipient(s) then use their private key to decrypt the symmetric key, and the symmetric key is then used to decrypt the message data.

BRIEF SUMMARY

A method includes obtaining, within an asynchronous messaging environment from a certificate server of an issuer of an existing digital certificate, a renewed digital certificate to replace the existing digital certificate, where the renewed digital certificate comprises an extended attribute that stores a serial number value of the existing digital certificate; receiving a message with a symmetric key encrypted using the existing digital certificate and identified within the message via the serial number value of the existing digital certificate; and processing the message using the renewed digital certificate.

A system includes a memory that stores an existing digital certificate and a processor programmed to obtain, within an asynchronous messaging environment from a certificate server of an issuer of the existing digital certificate, a renewed digital certificate to replace the existing digital certificate, where the renewed digital certificate comprises an extended attribute that stores a serial number value of the existing digital certificate; store the renewed digital certificate to the memory; receive a message with a symmetric key encrypted using the existing digital certificate and identified within the message via the serial number value of the existing digital certificate; and process the message using the renewed digital certificate.

A computer program product includes a computer readable storage medium including computer readable program code, where the computer readable program code when executed on a computer causes the computer to obtain, within an asynchronous messaging environment from a certificate server of an issuer of an existing digital certificate, a renewed digital certificate to replace the existing digital certificate, where the renewed digital certificate comprises an extended attribute that stores a serial number value of the existing digital certificate; receive a message with a symmetric key encrypted using the existing digital certificate and identified within the message via the serial number value of the existing digital certificate; and process the message using the renewed digital certificate.

DETAILED DESCRIPTION

Figure 1:
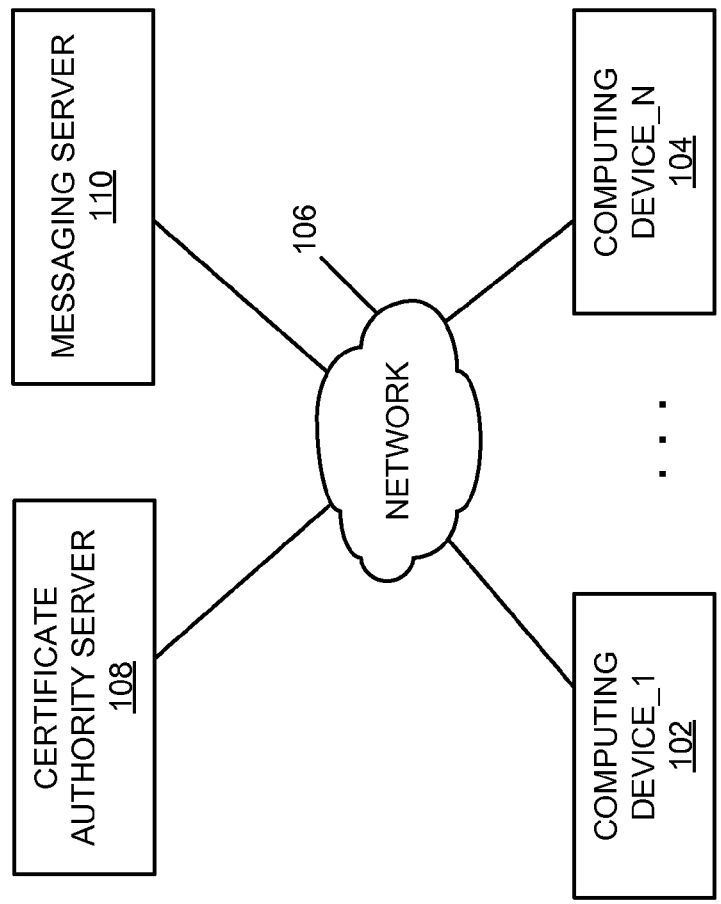
FIG. 1 is a block diagram of an example of an implementation of a system for automated renewal processing of digital certificates in an asynchronous messaging environment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides renewal processing of digital certificates in an asynchronous messaging environment. The subject matter also provides for use of the renewed digital certificates within the asynchronous messaging environment. The present subject matter provides an extension for digital certificates that are expired or expiring, such as those issued in compliance with the X.509 certificate standard, and an extension to asynchronous message processing. The extension for digital certificates expands digital certificate capabilities and the extension to asynchronous message processing expands digital certificate processing capabilities. The extension of the digital certificate includes a new extended attribute that indicates that the certificate is a renewal of another certificate, and the value of the new extended attribute is the serial number of the expired or expiring certificate. This new extended attribute may be added to a certificate when it is renewed, and renewal in this case may be performed with and signed by the same issuer as the original certificate so that the issuer may be matched to an issuer identified within the message for the expired or expiring digital certificate. The extension of the asynchronous message processing involves using, in the event that an encrypted symmetric key is not found using the recipient's new certificate serial number, the new extended attribute of a recipient certificate to locate the encrypted symmetric key intended for the recipient in the message payload.

Using the present subject matter, a digital certificate may be renewed at any time prior to expiration or after expiration. For example, a client device may request renewal of a digital certificate at any time prior to or contemporaneous with expiration of the certificate. Alternatively, a messaging server may request renewal of a certificate during received message processing in response to determining that the recipient's certificate is expired. Additionally, the renewed certificate may be stored in a key store used by the messaging processing environment/system to allow the continuation of asynchronous messaging without interruption of message throughput, and without system reconfiguration or system downtime. The key store may be located at the respective client devices, or may be located at a messaging server or other location accessible via the messaging server. A configured time for obtaining the renewed digital certificate relative to an expiration date of the existing digital certificate may be established by client devices to allow ongoing renewal of digital certificates. In any event, only valid certificates are used within the asynchronous messaging environment, and received messages may be processed that have symmetric keys encrypted and identified within the messages with serial numbers of expired (or old/expiring) digital certificates.

The renewed digital certificate uses the same key pair (e.g., identical public and private keys) as the old/existing certificate, and is renewed by the same issuer (so that it is signed using the same private key of the original issuer and has the same issuer identifier as the original certificate). As described above, the extended attribute identifies/stores the serial number of the old/existing (e.g., expired or expiring) digital certificate. As such, the serial number stored within the extended attribute may be used in conjunction with the issuer identification to locate/identify a symmetric key that was encrypted with an intended message recipient's public key within a message payload.

By use of the present subject matter, asynchronous message processing is not impeded by expired or expiring recipient certificates. Additionally, only valid certificates are used, and expired certificates are not used. Further, there is no impact to the digital certificate standards, such as the X.509 standard, because a new extended attribute is used. Regarding asynchronous message processing, logic to find the encrypted key for a recipient using the new extended attribute value may be implemented for processing of received messages in situations where a current digital certificate serial number is not found within a message payload. Expired certificates may be replaced without message system downtime, reconfiguration, or manual intervention of the messaging system.

The new extended attribute may be requested and used in conjunction with a determination that a digital certificate is about to expire (e.g., at a client device) or has expired (e.g., at a messaging server device). As such, a key store may be updated with a renewed digital certificate including the new extended attribute described herein at any time prior to or at/after expiration of an existing digital certificate.

It should be noted that conception of the present subject matter resulted from recognition of certain limitations associated with digital certificate expiration in an asynchronous messaging environment. For example, it was observed that in an asynchronous messaging environment, the creation of the message and the consumption of the message are independent. It was noted that, consequently, there is an indeterminate period of time between the two operations. As such, it was determined that for implementations where validity of digital certificates is used, and the certificate of the recipient(s) expires during this indeterminate period of time, the message cannot be validly decrypted. In was additionally observed that when the encrypted symmetric key is added to the message payload, the encrypted symmetric key is associated with details of the recipient certificate issuer and serial number. As such, it was determined that improvements to the processing of messages in an asynchronous environment should preserve the issuer identification and serial number of an expired/expiring certificate. The present subject matter provides a way to programmatically preserve the issuer identification and serial number of an expired/expiring certificate, as described above and more detail below, such that message system downtime, reconfiguration, or manual intervention of the messaging system are not required.

It was additionally determined that server and personal digital certificates, such as X.509 digital certificates, typically have an expiration/expiry date and that once the expiration date is reached, the certificate cannot generally be used for security purposes. It was observed that if the use of a certificate is required after the expiration, it is possible to generate a new certificate or renew the old certificate. However, for the new certificate alternative, while a new certificate may have similar attributes to the expired certificate, such as the Subject Distinguished Name (DN), new certificates typically will also have new public and private keys. It was determined that in a case where the recipient certificate expires, the new private key of the recipient will not match the public key of the expired certificate used for encryption within an outstanding or subsequently received asynchronous message, and the message may not be validly processed. It was further determined, for the renewed certification alternative, that an issuer of a renewed certificate may issue the renewed certificate with similar attributes and retain the same public and private key pair. However, it was also determined that an issuer of a renewed certificate includes a new serial number in the renewed certificate. It was also observed that in asynchronous messaging standards, such as PKCS#7, the recipient of a message may locate its encrypted symmetric key (note that there is one such encrypted symmetric key for each potential recipient within a message), by matching the certificate issuer and serial number embedded in the message with those elements of its own certificate. However, it was determined that because the serial number is changed when a certificate is renewed, the recipient will not be able to match the issuer and serial number with its renewed certificate, and valid decryption will be unsuccessful. Consequently, it was determined that the recipient will not be able to use the renewed certificate to decrypt the message data because the message payload will not contain an encrypted symmetric key associated with the renewed certificate's issuer and serial number.

In view of the several issues associated with conventional certificate management, the present subject matter manages expired or expiring digital certificates in an asynchronous messaging environment. The present subject matter may be used for implementations where certificate validation is used, though it should be noted that there is no prohibition against using the present subject matter for implementations where certificate validation is not used. The present subject matter improves digital certificate expiration and management processing by providing an extension for digital certificates, such as those issued in compliance with the X.509 certificate standard, and an extension to asynchronous message processing, as described above and in more detail below. As such, improved digital certificate processing within asynchronous messaging environments may be obtained through the renewal processing of digital certificates in an asynchronous messaging environment as described herein.

Additionally, the extended attribute described herein may be considered a configuration option and may be implemented in a granular manner as appropriate for a given implementation. For example, extended attribute processing for a renewed digital certificate may be implemented on a system, device, or application level. As such, and as described in more detail below, situations may exist where the recipient's digital certificate does not pass validation, such as where the recipient's digital certificate is expired and the recipient did not renew its digital certificate as described herein. This processing is described herein to illustrate the flexibility of implementation of the present subject matter. However, it is understood that the present subject matter improves both digital certificate renewal processing and message processing within messaging asynchronous environments, and non-granular implementation of the present subject matter may improve message processing across entire systems.

The renewal processing of digital certificates in an asynchronous messaging environment described herein may be performed in real time to allow prompt processing for expired digital certificates. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

For purposes of the following examples, asynchronous message processing is used. However, the present subject matter may be applied to synchronous message processing without departure from the scope of the present subject matter.

As described above, the present subject matter provides an expansion of a digital certificate, such as an X.509 certificate, to include a new extended attribute that indicates that the certificate is a renewal of another certificate. The value of the attribute is the serial number of the expired/expiring certificate. This new extended attribute may be added to a certificate when it is renewed, and renewal in this case is provided and signed by the same issuer as the original certificate. As such, both the original issuer identification and the serial number of the expired/expiring certificate are available for identification of encrypted symmetric keys within pending or subsequent messages.

The following example pseudo-certificate syntax represents an example of a portion of an X.509 certificate.

```
Certificate:
    Data:
        Version: 3
        Serial Number: 0x47AB6390
        Signature Algorithm: sha1WithRSAEncryption
        Issuer: C=AU, O=COMPANY, CN=MYCA
        Validity
            Not Before: Feb 13 07:15:00 2010 GMT
            Not After: Feb 13 23:59:59 2011 GMT
        Subject: C=AU, O=COMPANY, CN=Recipient One
```

-continued
```
        Subject Public Key Info:
            Public Key Algorithm: rsaEncryption
            RSA Public Key: (1024 bit)
            ...
        X509v3 extensions:
            ...
```

In the above example pseudo-certificate syntax, the certificate has an issuer ("Issuer") of C=AU,O=COMPANY, CN=MYCA (which represent country (C), organization (O), and common name (CN), respectively, and which collectively form a distinguished name (DN) for the certificate), a serial number ("Serial Number) of 0x47AB6390, and an expiration date of Feb. 13, 2011 ("Validity . . . Not After:").

The following example pseudo-certificate syntax shows an example of a renewed digital certificate that represents a renewal of the digital certificate described above.

```
Certificate:
    Data:
        Version: 3
        Serial Number: 0x48FFD1A6
        Signature Algorithm: sha1WithRSAEncryption
        Issuer: C=AU, O=COMPANY, CN=MYCA
        Validity
            Not Before: Aug 25 13:47:22 2011 GMT
            Not After: Aug 25 23:59:59 2012 GMT
        Subject: C=AU, O=COMPANY, CN=Recipient One
        Subject Public Key Info:
            Public Key Algorithm: rsaEncryption
            RSA Public Key: (1024 bit)
            ...
        X509v3 extensions:
            X509v3 Certificate Renewal:
                0x47AB6390
```

It should be noted that the renewed digital certificate has the same certificate details as the old/existing digital certificate (e.g., an expired or expiring digital certificate). The renewed digital certificate includes the public key of the old/existing digital certificate, but has a new expiration date, a new serial number, and the new extended attribute "X509v3 Certificate Renewal" with a value of the serial number of the old/existing digital certificate (e.g., 0x47AB6390). As such, the renewed digital certificate includes the serial number of the old/existing digital certificate. As described above and in more detail below, this extended attribute with the value of the serial number of the old/existing digital certificate may be used to process messages with a symmetric key encrypted using the old/existing digital certificate.

It should additionally be noted that the above examples are for illustration purposes only and utilize version 3 pseudo-syntax for the X.509 standard. However, the present subject matter is not limited to any particular standard or version of any such standard. Accordingly, the present subject matter may be applied to any standard as appropriate for a given implementation without departure from the scope of the present subject matter.

It should further be noted, as described above, that the old/existing digital certificate may be expired at the time of the renewal operation or may expire at some point after the renewed digital certificate is issued. In such a situation, the old/existing digital certificate may not be validated within systems that require validation because it is a non-valid and expired digital certificate. In contrast, the renewed digital certificate may be validated within systems that require validation because it is a valid and non-expired digital certificate.

Accordingly, validated message processing of messages with a symmetric key encrypted using an old/existing expired digital certificate may be performed using the present subject matter in situations where validation would otherwise fail.

As described above and in more detail below, two example operations for renewal processing are described herein. One example of renewal processing is performed by the certificate authority (e.g., issuer), where the certificate authority accepts the serial number of the old/existing (e.g., expired or expiring) digital certificate as input, such as from a client device or messaging server, and generates the renewed certificate with by adding the new extended attribute with the serial number of the old/existing (e.g., expired or expiring) digital certificate as the attribute value. In an alternative example, the certificate authority may accept the old/existing digital certificate as input from the client device or messaging server, and the certificate authority may extract the old serial number and generate the renewed certificate with the new extended attribute and the extracted serial number value. However, it should be noted that while these two alternatives are described in detail herein, additional renewal processing operations are possible and all such operations are considered within the scope of the present subject matter.

Regarding messaging server-side processing, one example set of operations for processing asynchronous messages using a renewed digital certificate is described herein. Upon receipt of a message, the messaging server may perform a two-step process to attempt to identify a symmetric key encrypted for the recipient (e.g., an application executing on the client device). Both operations involve using the renewed digital certificate and, as described above, validation may be performed for a successful identification of an encrypted symmetric key in either situation. Using the renewed digital certificate, the messaging server may first attempt to identify the encrypted symmetric key using the new serial number of the message recipient's renewed digital certificate and the issuer identifier within the renewed digital certificate. If this first attempted identification is successful, processing for validation of the recipient's digital certificate may be performed along with subsequent processing of the message when the recipient's renewed digital certificate passes validation. Validation of the recipient's digital certificate may include, for example, verifying that the current time is not later than the end of the certificate validity period and that the digital certificate is not expired, that the certificate issuer name is not an empty distinguished name, that a current time/date is not earlier than the start time/date of the certificate validity period, that the certificate signature is correct, that the certificate is not revoked, etc. Many other possibilities exist for validation of a recipient's digital certificate and all are considered within the scope of the present subject matter.

If the first attempted identification using the new serial number is not successful, the messaging server may utilize the value within the extended attribute of the serial number of the old/existing (e.g., expired or expiring) digital certificate and the issuer identifier within the renewed digital certificate to attempt to identify the encrypted symmetric key. If this second attempted identification is successful, processing for validation of the recipient's digital certificate may be performed, for example as described above, along with subsequent processing of the message when the recipient's renewed digital certificate passes validation. An error may be flagged in the event of either failure of the digital certificate validation (e.g., where a device is not configured to renew a certificate as described herein) or lack of identification of an encrypted symmetric key within a message payload.

While the present examples illustrate the two-step process described above in the sequence described, this should not be considered limiting. The two steps may be reversed or additional processing may be added without departure from the scope of the present subject matter. Additionally, while the present subject matter is preferably implemented in an automated manner, an administrator may renew digital certificates as described herein without departure from the scope of the present subject matter.

FIG. 1 is a block diagram of an example of an implementation of a system 100 for automated renewal processing of digital certificates in an asynchronous messaging environment. For purposes of the present examples, the system 100 may be considered an asynchronous messaging system. However, as described above, the present subject matter may be implemented within a synchronous messaging system without departure from the scope of the present subject matter.

A computing device_1 102 through a computing device_N 104 communicate via a network 106 with a certificate authority server 108 and a messaging server 110.

The computing device_1 102 through the computing device_N 104 may be considered client devices for purposes of the present description and may be any device capable of performing message generation or reception and subsequent processing. It should further be noted that the computing device_1 102 through the computing device_N 104 may be a portable computing device, either by a user's ability to move the respective computing device to different locations, or by the respective computing device's association with a portable platform, such as a plane, train, automobile, or other moving vehicle. For example, the computing device_1 102 through the computing device_N 104 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The certificate authority server 108 may be considered a certificate issuer server. For purposes of the present examples, the computing device_1 102 through the computing device_N 104 and/or the messaging server 110 renew digital certificates with the same certificate issuer server, such as the certificate authority server 108, so that the issuer identifier and issuer signature match the respective aspects of the old/ expiring digital certificate. As such, renewed digital certificates may have the same issuer identifier, and that issuer identifier may be used in conjunction with the serial number of the expired existing digital certificate within the extended attribute of the renewed digital certificate to identify encrypted symmetric keys within messages where the symmetric key was encrypted using the public key within the expired system digital certificate.

The messaging server 110 may be considered a message queuing server. The messaging server 110 provides asynchronous messaging services within the system 100 on behalf of the computing device_1 102 through the computing device_N 104. As described in more detail below, the messaging server 110 may also request renewal of recipient digital certificates in response to message processing and a determination that a particular recipient's digital certificates used to encrypt a symmetric key of a received message has expired. The messaging server 110 may also implement and utilize a secure socket layer (SSL) interface/connectivity to the respective computing device_1 102 through the computing device_N 104, and/or the certificate authority server 108, for any of the processing described herein.

As will be described in more detail below in association with FIG. 2 through FIG. 6B, the computing device_1 102 through the computing device_N 104 and the messaging server 110, in conjunction with the certificate authority server 108, provide automated renewal processing of digital certificates in an asynchronous messaging environment. The automated renewal processing of digital certificates in an asynchronous messaging environment is based upon renewal of digital certificates via the same certificate issuer server from which the existing/expiring/expired digital certificate was issued so that the renewed digital certificate has the same issuer identifier and issuer signature. The automated renewal processing of digital certificates in an asynchronous messaging environment further leverages the new extended attribute that stores a value of the serial number of the existing/expiring/expired digital certificate.

Accordingly, processing to renew a digital certificate may be performed at any time prior to (e.g., by client devices in an automated manner or administrators) or at/after expiration of an existing digital certificate (e.g., by client devices or a messaging server in an automated manner, or by administrators). This renewal may be configured at client devices based upon time to expiration of an existing digital certificate, may be configured at client devices based upon a scheduled periodicity, or may be based upon any other factors as appropriate for a given implementation. This renewal may be requested by the messaging server in response to a determination that a particular recipient's digital certificate used to encrypt a symmetric key of a received message has expired.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices. It should be noted that while the present example utilizes the network 106 to provide interconnection between multiple devices, the present subject matter may alternatively be implemented on a single host without departure from the scope of the present subject matter.

Figure 2:
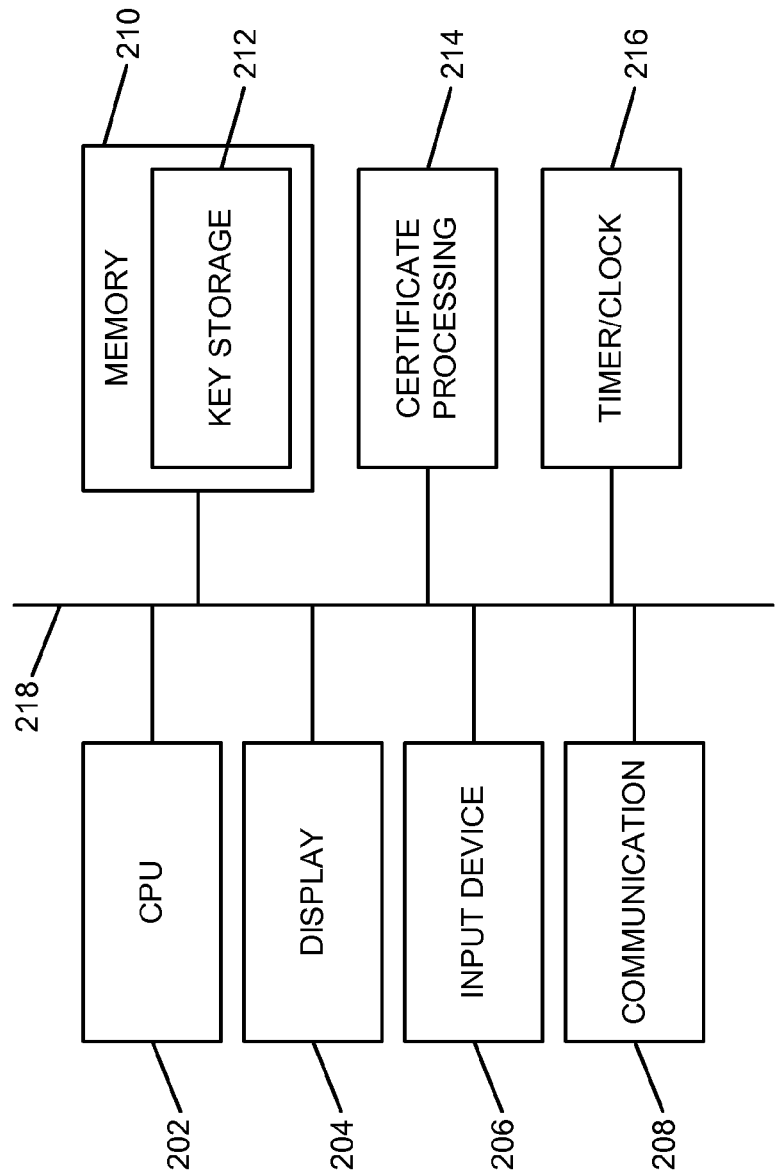
FIG. 2 is a block diagram of an example of an implementation of a core processing module capable of performing automated renewal processing of digital certificates in an asynchronous messaging environment according to an embodiment of the present subject matter.

FIG. 2 is a block diagram of an example of an implementation of a core processing module 200 capable of performing automated renewal processing of digital certificates in an asynchronous messaging environment. The core processing module 200 may be associated with each of the computing device_1 102 through the computing device_N 104, the certificate authority server 108, and the messaging server 110. Additionally, as described above, the present subject matter may alternatively be implemented on a single host without departure from the scope of the present subject matter. In such an implementation, the messaging server 110 may also be implemented via the core processing module 200. As such, the core processing module 200 is described generally with respect to FIG. 2.

However, it is understood that the core processing module 200 may provide different and complementary renewal processing of digital certificates in association with each implementation, as described above and in more detail below. As such, for any of the examples, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 may be optional components for the core processing module 200 for certain implementations (e.g., for an embedded implementation of the certificate authority server 108 or for embedded implementations of the computing device_1 102 through the computing device_N 104). Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a key storage area 212 that stores digital certificates within the core processing module 200. For client-side implementations or for messaging server-side implementations of the core processing module 200, digital certificates may be stored within the key storage area 212 for each operating system (OS) user operative in association with the respective device. It is additionally understood that the key storage area 212 may be utilized by the messaging server 110 to store client digital certificates for message transmission and reception processing (e.g., encryption and decryption, respectively) on behalf of the respective client devices. For certificate authority server-side implementations of the core processing module 200, digital certificates may be stored within the key storage area 212 for each client device or application that is requesting a renewed digital certificate. As such, the key storage area 212 represents both a storage area and a processing area for generation of renewed digital certificates, respectively, as appropriate for each implementation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A certificate processing module 214 is also illustrated. The certificate processing module 214 provides digital certificate management for the core processing module 200, as described above and in more detail below. The certificate processing module 214 implements the automated renewal processing of digital certificates in an asynchronous messaging environment of the core processing module 200. For client-side or messaging server-side implementations of the core processing module 200, existing digital certificates may be stored within the key storage area 212. For client-side implementations, the stored existing digital certificates may be monitored and configured for renewal, and the renewed digital certificates may be stored in response to receipt either locally or at the messaging server 110. For messaging server-side implementations, received messages may be processed using the renewed digital certificates by the certificate processing module 214. For certificate authority server-side implementations of the core processing module 200, digital certificates may be generated/created by the certificate processing module 214 for each client device/application or for the messaging server 110, as appropriate for the given implementation, that is requesting a renewed digital certificate.

Though the certificate processing module 214 is illustrated as a component-level module for ease of illustration and description purposes, it should be noted that the certificate processing module 214 may include any hardware, programmed processor(s), and memory used to carry out the functions of this module as described above and in more detail below. For example, the certificate processing module 214 may include additional controller circuitry in the form of application specific integrated circuits (ASICs), processors, and/or discrete integrated circuits and components for performing communication and electrical control activities associated with the respective devices. Additionally, the certificate processing module 214 may include interrupt-level, stack-level, and application-level modules as appropriate. Furthermore, the certificate processing module 214 may include any memory components used for storage, execution, and data processing for performing processing activities associated with the module.

It should also be noted that the certificate processing module 214 may form a portion of other circuitry described without departure from the scope of the present subject matter. Further, the certificate processing module 214 may alternatively be implemented as an application stored within the memory 210. In such an implementation, the certificate processing module 214 may include instructions executed by the CPU 202 for performing the functionality described herein. The CPU 202 may execute these instructions to provide the processing capabilities described above and in more detail below for the core processing module 200. The certificate processing module 214 may form a portion of an interrupt service routine (ISR), a portion of an operating system, a portion of a browser application, or a portion of a separate application without departure from the scope of the present subject matter.

A timer/clock module 216 is illustrated and used to determine timing and date information, such as for processing renewal requests associated with expiration of digital certificates, as described above and in more detail below. As such, the certificate processing module 214 may utilize information derived from the timer/clock module 216 for information processing activities, such as the automated renewal processing of digital certificates in an asynchronous messaging environment, as described herein.

The CPU 202, the display 204, the input device 206, the communication module 208, the memory 210, the certificate processing module 214, and the timer/clock module 216 are interconnected via an interconnection 218. The interconnection 218 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

FIG. 3 through FIG. 6B described below represent example processes that may be executed by devices, such as the core processing module 200, to perform the automated renewal processing of digital certificates in an asynchronous messaging environment associated with the present subject matter. Many other variations on the example processes are possible and all are considered within the scope of the present subject matter. The example processes may be performed by modules, such as the certificate processing module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

Figure 3:
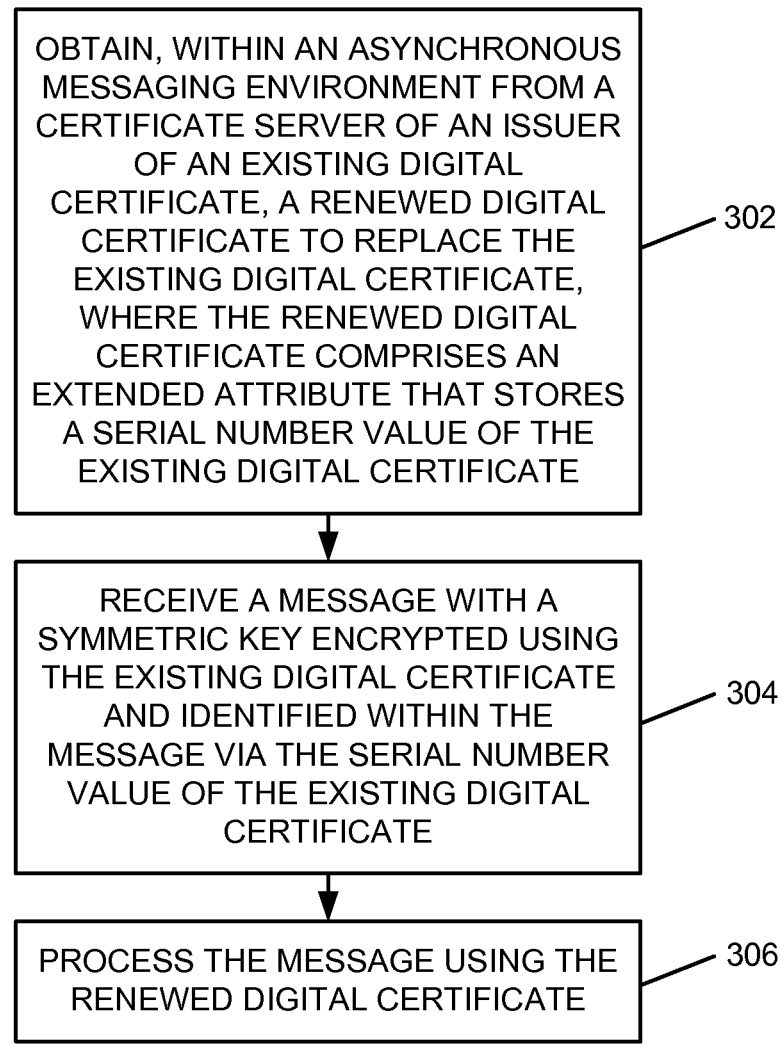
FIG. 3 is a flow chart of an example of an implementation of a process for automated renewal processing of digital certificates in an asynchronous messaging environment according to an embodiment of the present subject matter.

FIG. 3 is a flow chart of an example of an implementation of a process 300 for automated renewal processing of digital certificates in an asynchronous messaging environment. At block 302, the process 300 obtains, within an asynchronous messaging environment from a certificate server of an issuer of an existing digital certificate, a renewed digital certificate to replace the existing digital certificate, where the renewed digital certificate comprises an extended attribute that stores a serial number value of the existing digital certificate. At block 304, the process 300 receives a message with a symmetric key encrypted using the existing digital certificate and identified within the message via the serial number value of the existing digital certificate. At block 306, the process 300 processes the message using the renewed digital certificate.

Figure 4:
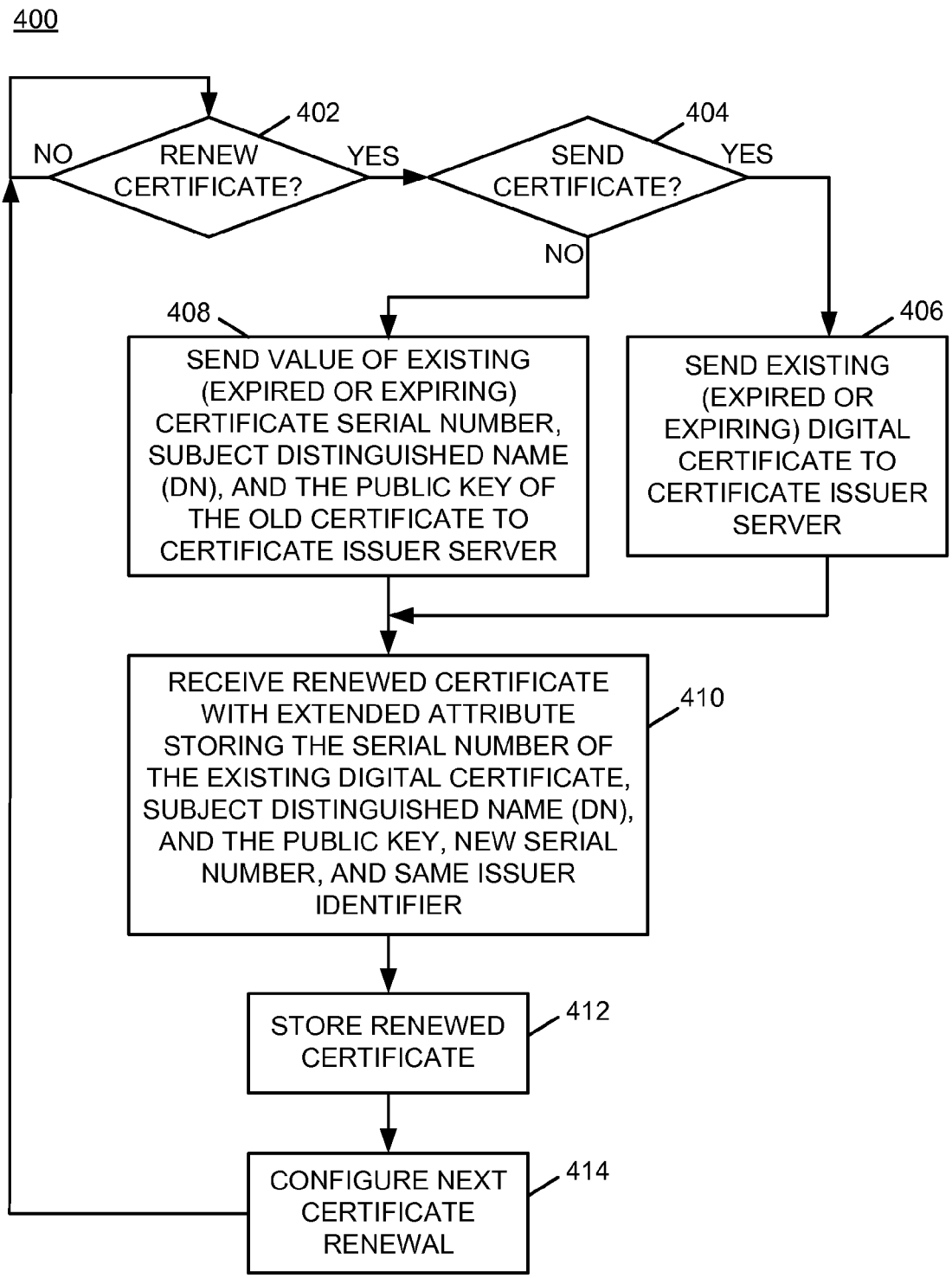
FIG. 4 is a flow chart of an example of an implementation of a process for automated renewal processing of digital certificates in an asynchronous messaging environment at a client device or at a messaging server to request a renewed digital certificate from a certificate issuer server according to an embodiment of the present subject matter.

FIG. 4 is a flow chart of an example of an implementation of a process 400 for automated renewal processing of digital certificates in an asynchronous messaging environment at a client device, such as by one or more of the computing device_1 102 through the computing device_N 104, or at a messaging server, such as the messaging server 110, to request a renewed digital certificate from a certificate issuer server, such as the certificate authority server 108. For purposes of the present example, it should be noted that a respective client device is configured to request renewal of a digital certificate via some configured time schedule or interval, such as a configured time frame relative to an expiration time of the current existing digital certificate. Initial operations for configuration of a time or event at which to request renewal of the digital certificate are omitted for brevity, but are considered to form a portion of the process 400. However, operations to configure certificate renewal are described in detail below. It should further be noted that a requested renewal of a digital certificate by a messaging server may be performed in response to a determination that a particular recipient's digital certificate that was used to encrypt a symmetric key of a received message is not or is no longer valid, as described above (e.g., expired, etc.).

At decision point 402, the process 400 makes a determination as to whether to generate and send a request to a certificate issuer server for a renewed digital certificate based upon an expiration time of an existing digital certificate. As described above, this determination may be made by client devices prior to expiration of the existing digital certificate and the timer/clock module 216 may be utilized to configure and determine when to generate and send the request for the renewed digital certificate. The determination at decision point 402 may be made, for example, in response to an interrupt from the timer/clock module 216, or the process 400 may poll the timer/clock module 216 at decision point 402 to determine when to request renewal of an existing (expired or about to expire) digital certificate. As also described above, this determination to request renewal of a digital certificate may be made by a messaging server in response to a determination that a particular recipient's digital certificate that was used to encrypt a symmetric key of a received message is not or is no longer valid, as described above (e.g., expired, etc.). This example processing may be performed at a messaging server device, such as the messaging server 110, in conjunction with processing described below in association with FIG. 6A-6B below. Other possibilities exist for making the determination as to whether to generate and send a request to a certificate issuer server for a renewed digital certificate, and all are considered within the scope of the present subject matter.

As additionally described above, the process 400 may request the renewed digital certificate from the same certificate issuer server that issued the existing digital certificate that is to be replaced by the renewed digital certificate so that the issuer identifier and issuer signature will be the same for the two digital certificates. This processing allows the renewed digital certificate to be used to locate the issuer identifier that will be used in conjunction with the value of the new extended attribute for identification of encrypted symmetric keys within messages.

In response to determining at decision point 402 to generate and send a request to a certificate issuer server for a renewed digital certificate based upon an expiration time of an existing digital certificate, the process 400 makes a determination at decision point 404 as to whether to send the existing digital certificate for renewal, or whether to send the serial number value of the existing digital certificate. In response to determining to send the existing digital certificate for renewal at decision point 404, the process 400 sends the existing or expired digital certificate to the respective certificate issuer server, such as the certificate authority server 108, at block 406. As described in more detail below in association with FIG. 5, the certificate authority server 108 may extract the respective fields from the existing or expired digital certificate and format an internal request into printable text with binary-represented printable characters (e.g., base64 encoding) for use by the certificate authority server 108 to generate the renewed digital certificate. Alternatively, in response to determining to send the serial number value of the existing digital certificate at decision point 404, the process 400 sends the value of the existing or expired digital certificate serial number, the subject distinguished name (DN), and the public key of the old certificate to the certificate issuer server, again such as the certificate authority server 108, at block 408. As with the processing of the certificate authority server 108 described above, it should be understood that the certificate authority server 108 may receive the respective fields and format the fields into printable text with binary-represented printable characters (e.g., base64 encoding) for use by the certificate authority server 108 to generate the renewed digital certificate. The formatting of the printable characters may include the new extended attribute describe herein, and the returned renewed certificate may also include the new attribute.

In response to either sending the existing or expired digital certificate to the respective certificate issuer server at block 406, or in response to sending the existing or expired digital certificate serial number to the certificate issuer server at block 408, the process 400 receives the renewed digital certificate at block 410. The renewed digital certificate includes the extended attribute with a value of the serial number of the existing digital certificate that is to be replaced by the renewed digital certificate, a new serial number for the renewed digital certificate, and the same issuer identifier as the existing digital certificate that is to be replaced by the renewed digital certificate.

At block 412, the process 400 stores the renewed digital certificate to a key store, such as the key storage area 212. The process 400 configures the next certificate renewal at block 414, such as by configuring an interrupt from the timer/clock module 216, returns to decision point 402 and iterates as described above. Alternatively, the process 400 may poll the timer/clock module 216 at decision point 402.

As such, the process 400 allows a client device to implement and process a variety of configuration options for generating and sending requests for renewed digital certificates. The process 400 also determines whether to send the existing (expired or expiring) digital certificate, or whether to send the serial number of the existing digital certificate, to the certificate issuer server. The process 400 receives and stores the renewed digital certificate and configures a next certificate renewal based on a variety of alternative configuration options.

Figure 5:
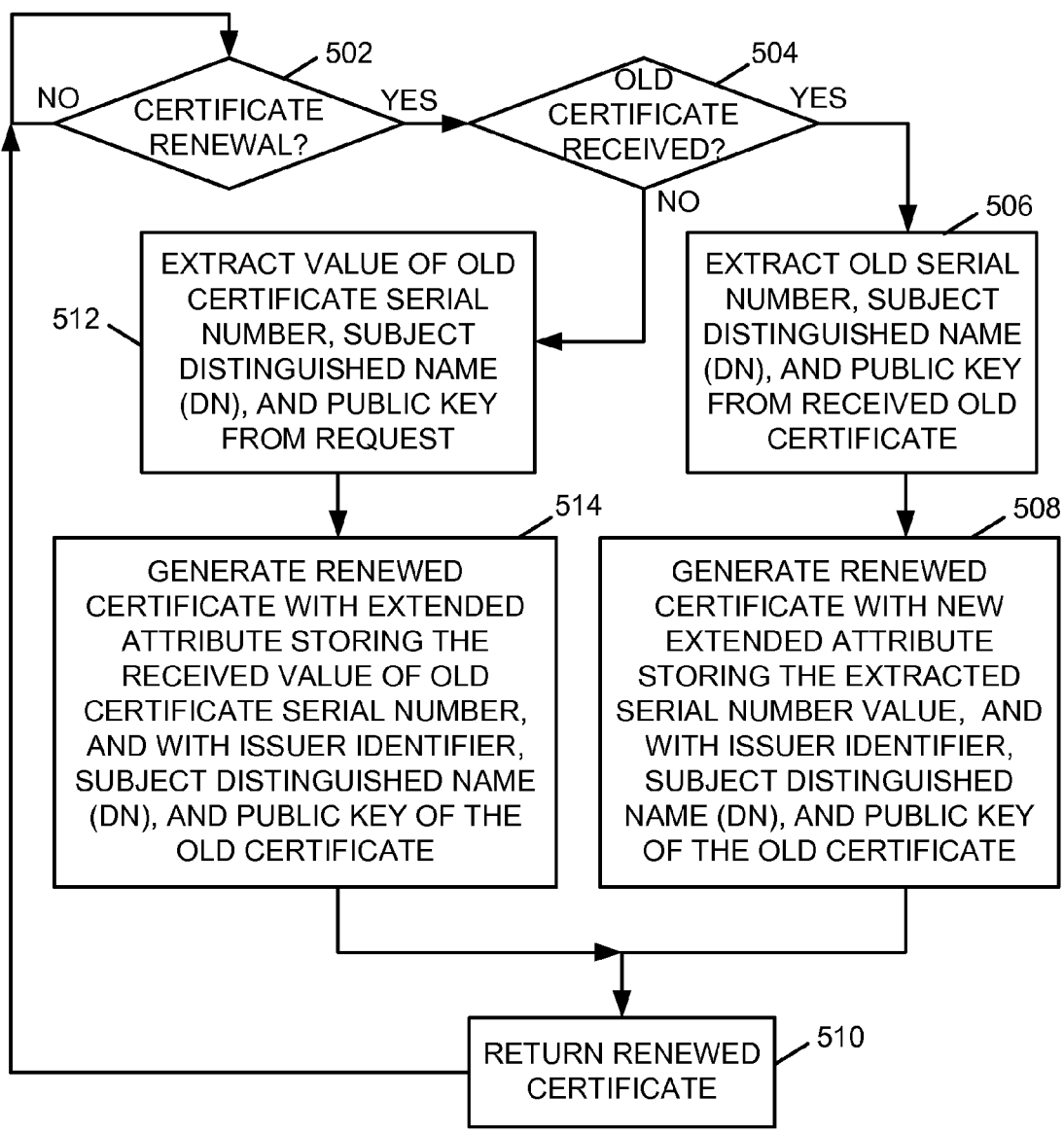
FIG. 5 is a flow chart of an example of an implementation of a process for automated renewal processing of digital certificates in an asynchronous messaging environment by a certificate issuer server in response to requests from one or more client device for a renewed digital certificate according to an embodiment of the present subject matter.

FIG. 5 is a flow chart of an example of an implementation of a process 500 for automated renewal processing of digital certificates in an asynchronous messaging environment by a certificate issuer server, such as the certificate authority server 108, in response to requests from one or more of the computing device_1 102 through the computing device_N 104 or the messaging server 110, for a renewed digital certificate. At decision point 502, the process 500 makes a determination as to whether a certificate renewal request has been received.

In response to determining at decision point 502 that a certificate renewal request has been received, the process 500 makes a determination at decision point 504 as to whether the old/existing digital certificate to be renewed has been received in association with the certificate renewal request, or whether the serial number value of the existing digital certificate was received.

In response to determining at decision point 504 that the existing digital certificate itself was received, the process 500 extracts the old serial number, the subject distinguished name (DN), and the public key of the old certificate from the received old/existing digital certificate at block 506. At block 508, the process 500 generates the renewed certificate with a new extended attribute storing the extracted serial number as the value of the extended attribute, the issuer identifier of the certificate issuer server that is executing the process 500, the subject distinguished name (DN), and the public key of the old certificate. As described above, it should be understood that generation of the renewed digital certificate may be performed via a new interface via any manner appropriate for a given implementation. Additionally, a certificate request may be formatted into printable text with binary-represented printable characters (e.g., base64 encoding) for use within the internal request to generate the renewed digital certificate. The formatting of the printable characters may include the new extended attribute describe herein, and the renewed certificate would also include the new attribute. At block 510, the process 500 returns the renewed digital certificate to the respective requesting device in response to the certificate renewal request. The process 500 returns to decision point 502 and iterates as described above.

Returning to the description of decision point 504, in response to determining that the old/existing digital certificate was not received and that the serial number value of the existing digital certificate was received, the process 500 extracts the old/existing digital certificate serial number, the subject distinguished name (DN), and the public key from the request at block 512. As with the processing described above, a certificate request may be formatted using the extracted information into printable text with binary-represented printable characters (e.g., base64 encoding) for use within the internal request to generate the renewed digital certificate. The formatting of the printable characters may include the new extended attribute describe herein, and the renewed certificate would also include the new attribute. As such, the process 500 accepts as input the attributes to be used to generate the renewed digital certificate.

At block 514, the process 500 generates the renewed digital certificate with the extended attribute storing the received value of the old/existing digital certificate serial number, the issuer identifier of the certificate issuer server that is executing the process 500, the subject distinguished name (DN), and the received public key of the old certificate. The process 500 transitions to block 510 to return the renewed digital certificate to the respective requesting device in response to the certificate renewal request, and to decision point 502 and iterates as described above.

As such, the process 500 processes digital certificate renewal requests that include either an old/existing digital certificate or attributes with which to renew an existing digital certificate. The process 500 generates the renewed digital certificate and returns the renewed digital certificate in response to the certificate renewal request.

It should be noted, that for certain implementations, the existing digital certificate does not have to be retained by the requesting client or messaging server devices. For example, as long as a requesting client or messaging server either sends the existing digital certificate along with the certificate renewal request or sends the attributes used for renewal of existing digital certificate, the client or messaging server may delete the old/existing digital certificate or may retain the old/existing digital certificate as appropriate for the given implementation.

It should also be noted that generating a certificate involves signing it with the private key of the issuer, and that for certificate renewal only the original issuer will have the private key for use in creation of a certificate. As such, renewal of certificates as described herein is performed via the original certificate issuer to maintain continuity of issuer identify and signature with the private key of the same issuer. Additionally, as described above, a certificate may be renewed before it expires and put in place for use on the receiving end(s), and then rolled-out to the sending end(s). As such, many variations in the processing described exist and all are considered within the scope of the present subject matter.

Figure 6A:
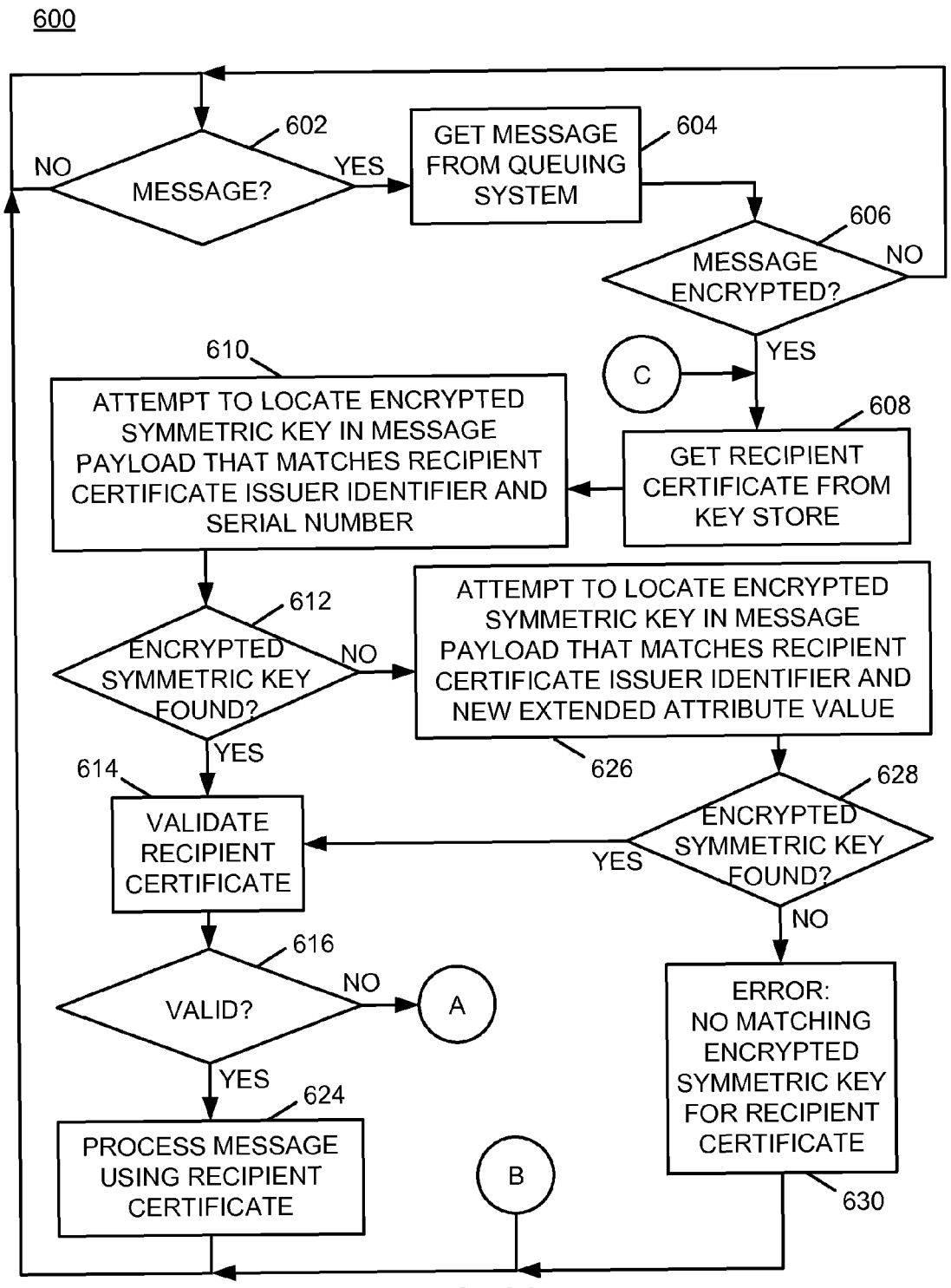
FIG. 6A is a flow chart of initial processing for an example of an implementation of a process for automated renewal processing of digital certificates in an asynchronous messaging environment by a messaging server device for processing of messages within an asynchronous messaging environment using a renewed digital certificate according to an embodiment of the present subject matter.
Figure 6B:
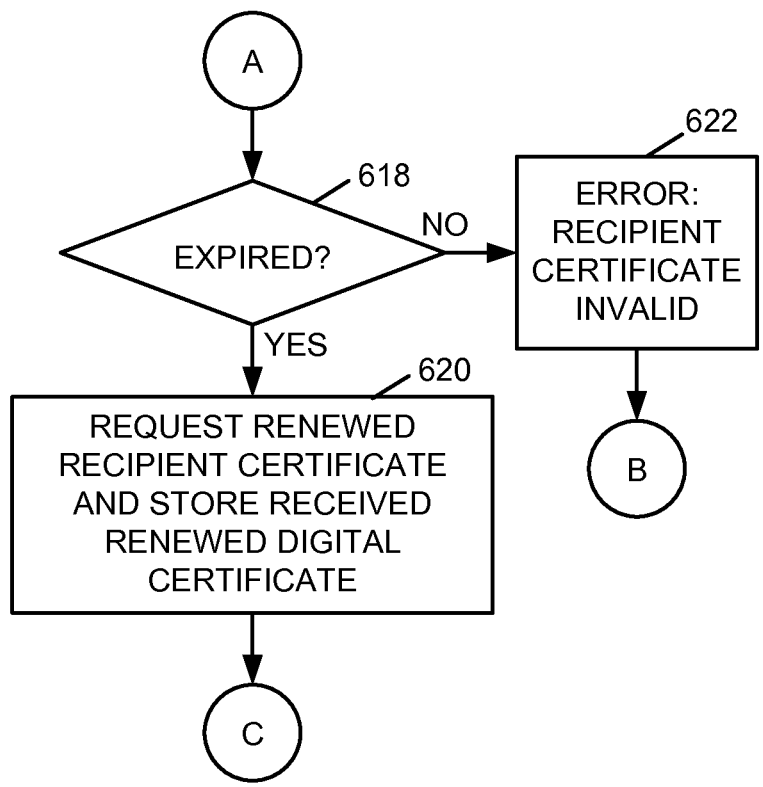
FIG. 6B is a flow chart of additional processing for an example of an implementation of a process for automated renewal processing of digital certificates in an asynchronous messaging environment by a messaging server for processing of messages within an asynchronous messaging environment using a renewed digital certificate according to an embodiment of the present subject matter.

FIGS. 6A-6B illustrate a flow chart of an example of an implementation of a process 600 for automated renewal processing of digital certificates in an asynchronous messaging environment by a messaging server device, such as the messaging server 110, for processing of messages within an asynchronous messaging environment, such as the system 100, using a renewed digital certificate. FIG. 6A illustrates initial processing within the process 600.

As described above, configuration of devices and applications within a system to utilize the present subject matter may be granular. As such, the process 600 may be implemented by devices that are or that are not configured to request and/or receive, and use renewed digital certificates. Accordingly, certain error processing that is described below may be appropriate for devices that are not configured to request and/or receive, and use a renewed digital certificate. However, it should also be noted that these error conditions would not be true for devices or applications that are configured to request and/or receive, and use renewed digital certificates.

It should additionally be noted that, for devices that are configured to request and/or receive, and use a renewed digital certificate, the process 600 is assumed to be used in conjunction with a process to request, receive, and store a renewed digital certificate, such as the process 400 described above in association with FIG. 4. For such devices, it is the renewed digital certificate that will be used in association with processing of received messages and not an old/existing (e.g., expired or expiring) digital certificate. Accordingly, only valid and non-expired renewed digital certificates may be used by these configured devices.

At decision point 602, the process 600 makes a determination as to whether a message has been received. In response to determining at decision point 602 that a message has been received, the process 600 gets the received message from a queuing system, such as a local queuing system of the messaging server 110, at block 604. At block 606, the process 600 makes a determination as to whether the message is encrypted. In response to determining that the message is not encrypted, the process 600 returns to decision point 602 and iterates as described above. Client devices may perform "get" operations to retrieve messages for the respective devices as appropriate for the respective client devices. As such, it is understood that processing of the actual message payload is omitted in this circumstance from the process 600 for brevity.

In response to determining that the message is encrypted at decision point 606, the process 600 obtains the recipient digital certificate from a key store, such as a local implementation of the key storage area 212 or from storage within the key storage area 212 of the respective recipient client device, at block 608. At block 610, the process 600 attempts to locate an encrypted symmetric key in the message payload that matches the recipient certificate issuer identifier and digital certificate serial number.

As described above, the recipient certificate will be a renewed digital certificate for devices that are configured to use the renewed digital certificates described herein. However, as also described above, the serial number of the renewed digital certificate will not match a serial number associated with an encrypted symmetric key within a received message that was encrypted using the old/existing digital certificate.

Accordingly, the process 600 makes a determination at decision point 612 as to whether the encrypted symmetric key for the recipient has been found within the message payload. In response to determining that the encrypted symmetric key for the recipient has been found within the message payload (e.g., the encrypted symmetric key was encrypted using the renewed digital certificate), the process 600 validates the recipient's renewed digital certificate by confirming that the recipient's renewed digital certificate is valid at block 614. As described above, example processing to confirm that the recipient's renewed digital certificate is valid may include, for example, verifying that the current time is not later than the end of the certificate validity period and that the digital certificate is not expired, that the certificate issuer name is not an empty distinguished name, that a current time/date is not earlier than the start time/date of the certificate validity period, that the certificate signature is correct, that the certificate is not revoked, etc. Many other possibilities exist for validation of a recipient's digital certificate and all are considered within the scope of the present subject matter.

It should be noted that in a secure messaging environment, where validity of certificates is utilized (e.g., mandatory), the recipient certificate may be validated to ensure that it meets installation requirements, as described above. It should also be noted that, without aid of the present subject matter, an expired certificate would fail this validation and could not be used to process the message.

At decision point 616, process 600 makes a determination as to whether the recipient's renewed digital certificate is valid. In response to determining that the recipient's existing or renewed digital certificate is not valid at decision point 616, the process 600 transitions to the processing shown and described in association with FIG. 6B.

FIG. 6B illustrates additional processing associated with the process 600 for automated renewal processing of digital certificates in an asynchronous messaging environment by a messaging server device, such as the messaging server 110, for processing of messages within an asynchronous messaging environment, such as the system 100, using a renewed digital certificate. At decision point 618, the process 600 makes a determination as to whether the determination that the recipient's existing or renewed digital certificate is not valid at decision point 616 is because the recipient's existing or renewed digital certificate is expired (e.g., as opposed to several other reasons for invalidity described above). In response to determining that the recipient's existing or renewed digital certificate is invalid because it is expired, the process 600 requests a renewed digital certificate for the recipient from the issuer of the expired certificate, such as the certificate authority server 108, and stores the received certificate at block 620. As described above, the process 600 may store the received recipient's renewed digital certificate to a key store, such as the key storage area 212 of the memory 210. Accordingly, the messaging server may be configured with permission/authority to obtain renewed digital certificates for recipients and to utilize/distribute the obtained renewed certificates. In this manner, messaging within a system, such as the system 100, may continue without interruption and system down time may be avoided.

It should also be noted that the processing to request and receive the renewed digital certificate is described in association with FIG. 4 above and is not duplicated here. As described above, a messaging server, such as the messaging server 110, determining that a recipient's digital certificate is expired may result in a request to renew a certificate being determined at decision point 402 of FIG. 4. As such, the processes 400 and 600 may be readily combined to perform the respective portions of the processing.

It should additionally be noted that the process 600 may also send the recipient's renewed digital certificate to the respective recipient at the respective client device for storage and use by the recipient and to alert the recipient that the certificate has been renewed. The recipient/client device may then also store the recipient's renewed digital certificate to a local key store, such as the key storage area 212 of the memory 210 at that device. In response to receiving and storing the received recipient's renewed digital certificate within the appropriate key store(s) at block 620, the process 600 returns to the processing described in association with FIG. 6A at block 608 and iterates as described above to retrieve the recipient certificate from the respective key store and perform the processing described above to attempt to locate the symmetric key encrypted for the recipient within the message payload.

Returning to the description of decision point 618, in response to determining that the determination that the recipient's existing or renewed digital certificate is not valid at decision point 616 is because of one or more of the several other reasons for invalidity described above (e.g., other than being expired), the process 600 generates an error at block 622 indicating that the recipient's digital certificate is not valid along with the respective reason(s) for invalidity. The process 600 returns to the processing described above in association with FIG. 6A at decision point 602 and iterates as described above.

Returning to the description of FIG. 6A at decision point 616, in response to determining that the recipient's renewed digital certificate is valid at decision point 616, the process 600 processes the message using the recipient's digital certificate at block 624. The processing performed at block 624 includes decrypting the symmetric key using the private key associated with the recipient's digital certificate and using the symmetric key to decrypt the message payload. The process 600 returns to decision point 602 and iterates as described above.

Returning to the description of decision point 612, the additional processing described below utilizes the extended attribute and attribute value that stores the serial number of the old/existing digital certificate to further process the message in a situation where the renewed digital certificate serial number and issuer identifier do not match the respective fields associated with any encrypted symmetric key within the message payload. As such, in response to determining at decision point 612 that the encrypted symmetric key for the recipient has not been found within the message payload, the process 600 attempts to locate an encrypted symmetric key in the message payload that matches the recipient's certificate issuer identifier and the new extended attribute value that stores the serial number of the old/existing digital certificate at block 626.

At decision point 628, the process 600 makes a determination as to whether the encrypted symmetric key has been found. In response to determining at decision point 628 that the encrypted symmetric key has been found, the process 600 returns to block 614 and iterates as described above to decrypt the symmetric key and validate the recipient's renewed digital certificate. As such, the process 600 may be utilized to process asynchronous messages for old/existing digital certificates (e.g., expired or expiring) using a renewed digital certificate and the renewed digital certificate that is used is a valid certificate rather than an expired/invalid digital certificate for the expired certificate case.

In response to determining at decision point 628 that the encrypted symmetric key has not been found, the process 600 generates an error indicating that no matching encrypted symmetric key for the recipient's digital certificate has been found within the message payload at block 630. This branch of error processing may be reached at devices that are not configured to utilize the new extended attribute and attribute value that stores the serial number of the old/existing digital certificate. The process 600 returns to decision point 602 and iterates as described above.

As such, the process 600 processes messages within an asynchronous messaging environment using a valid renewed digital certificate and may process messages with symmetric keys encrypted using an old/existing (e.g., expired or expiring) digital certificate. The process 600 utilizes an extended attribute and attribute value that stores the serial number of the old/existing digital certificate within the renewed digital certificate to process the messages with symmetric keys encrypted using the old/existing digital certificate.

As described above in association with FIG. 1 through FIG. 6B, the example systems and processes provide renewal processing of digital certificates in an asynchronous messaging environment. Many other variations and additional activities associated with renewal processing of digital certificates in an asynchronous messaging environment are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    obtaining, within an asynchronous messaging environment from a certificate server of an issuer of an existing digital certificate, a renewed digital certificate to replace the existing digital certificate, where the renewed digital certificate comprises a new certificate serial number, an extended attribute that stores a serial number value of the existing digital certificate, and an issuer identifier that matches an issuer identifier of the existing digital certificate;
    receiving a message with a symmetric key encrypted using the existing digital certificate and identified within the message via the serial number value of the existing digital certificate; and
    processing the message using the renewed digital certificate, comprising:
        determining whether the symmetric key encrypted using the existing digital certificate in a message payload matches the issuer identifier and the new certificate serial number of the renewed digital certificate;
        determining, in response to determining that the symmetric key encrypted using the existing digital certificate in the message payload does not match the issuer identifier and the new certificate serial number of the renewed digital certificate, whether the symmetric key encrypted using the existing digital certificate in the message payload matches the issuer identifier of the renewed digital certificate and the serial number value of the existing digital certificate stored within the extended attribute of the renewed digital certificate; and
        in response to determining that the symmetric key encrypted using the existing digital certificate in the message payload matches the issuer identifier of the renewed digital certificate and the serial number value of the existing digital certificate stored within the extended attribute of the renewed digital certificate:
            validating the renewed digital certificate; and
            in response to successful validation of the renewed digital certificate:
                decrypting the symmetric key using a private key of the renewed digital certificate;
                decrypting the received message payload using the decrypted symmetric key; and
                processing the decrypted message payload.

2. The method of claim 1, where the existing digital certificate comprises one of an expired digital certificate and a certificate determined to expire within a configured time relative to an expiration date of the existing digital certificate.

3. The method of claim 1, where obtaining, within the asynchronous messaging environment from the certificate server of the issuer of the existing digital certificate, the renewed digital certificate to replace the existing digital certificate comprises:
    sending, in response to determining that the existing digital certificate is expired, the existing digital certificate to the certificate server of the issuer of the existing digital certificate;

receiving the renewed digital certificate from the certificate server of the issuer of the existing digital certificate, where the renewed digital certificate comprises the new certificate serial number, a subject distinguished name (DN), a public key, and the issuer identifier of the issuer of the existing digital certificate, and the extended attribute storing the serial number value of the existing digital certificate; and designating the renewed digital certificate as valid for asynchronous message processing.

4. The method of claim 1, where obtaining, within the asynchronous messaging environment from the certificate server of the issuer of the existing digital certificate, the renewed digital certificate to replace the existing digital certificate comprises:

extracting, in response to determining that the existing digital certificate is expired, the serial number value, a subject distinguished name (DN), and a public key from the existing digital certificate;

sending the extracted serial number value, subject distinguished name (DN), and public key, and the extended attribute to the certificate server of the issuer of the existing digital certificate;

receiving the renewed digital certificate from the certificate server of the issuer of the existing digital certificate, where the renewed digital certificate comprises the new certificate serial number, the subject distinguished name (DN), the public key, and the issuer identifier of the issuer of the existing digital certificate, and the extended attribute storing the serial number value of the existing digital certificate; and designating the renewed digital certificate as valid for asynchronous message processing.

5. The method of claim 1, where processing the message using the renewed digital certificate comprises:

identifying the symmetric key encrypted using the existing digital certificate within the message payload of the received message using the issuer identifier of the renewed digital certificate and the serial number value of the existing digital certificate stored within the extended attribute of the renewed digital certificate.

6. The method of claim 1, further comprising:

in response to determining that the symmetric key encrypted using the existing digital certificate in the message payload does not match the issuer identifier of the renewed digital certificate and the serial number value of the existing digital certificate stored within the extended attribute of the renewed digital certificate:

generating an error indicating that the symmetric key encrypted using the existing digital certificate was not found in the message payload.

7. A system, comprising:

a memory that stores an existing digital certificate; and a processor programmed to:

obtain, within an asynchronous messaging environment from a certificate server of an issuer of the existing digital certificate, a renewed digital certificate to replace the existing digital certificate, where the renewed digital certificate comprises a new certificate serial number, an extended attribute that stores a serial number value of the existing digital certificate, and an issuer identifier that matches an issuer identifier of the existing digital certificate;

store the renewed digital certificate to the memory;

receive a message with a symmetric key encrypted using the existing digital certificate and identified within the message via the serial number value of the existing digital certificate; and process the message using the renewed digital certificate, the processor being programmed to:

determine whether the symmetric key encrypted using the existing digital certificate in a message payload matches the issuer identifier and the new certificate serial number of the renewed digital certificate;

determine, in response to determining that the symmetric key encrypted using the existing digital certificate in the message payload does not match the issuer identifier and the new certificate serial number of the renewed digital certificate, whether the symmetric key encrypted using the existing digital certificate in the message payload matches the issuer identifier of the renewed digital certificate and the serial number value of the existing digital certificate stored within the extended attribute of the renewed digital certificate; and in response to determining that the symmetric key encrypted using the existing digital certificate in the message payload matches the issuer identifier of the renewed digital certificate and the serial number value of the existing digital certificate stored within the extended attribute of the renewed digital certificate:

validate the renewed digital certificate; and in response to successful validation of the renewed digital certificate:

decrypt the symmetric key using a private key of the renewed digital certificate;

decrypt the received message payload using the decrypted symmetric key; and process the decrypted message payload.

8. The system of claim 7, where the existing digital certificate comprises one of an expired digital certificate and a certificate determined to expire within a configured time relative to an expiration date of the existing digital certificate.

9. The system of claim 7, where in being programmed to obtain, within the asynchronous messaging environment from the certificate server of the issuer of the existing digital certificate, the renewed digital certificate to replace the existing digital certificate, the processor is programmed to:

send, in response to determining that the existing digital certificate is expired, the existing digital certificate to the certificate server of the issuer of the existing digital certificate;

receive the renewed digital certificate from the certificate server of the issuer of the existing digital certificate, where the renewed digital certificate comprises the new certificate serial number, a subject distinguished name (DN), a public key, and the issuer identifier of the issuer of the existing digital certificate, and the extended attribute storing the serial number value of the existing digital certificate; and designate the renewed digital certificate as valid for asynchronous message processing.

10. The system of claim 7, where in being programmed to obtain, within the asynchronous messaging environment from the certificate server of the issuer of the existing digital certificate, the renewed digital certificate to replace the existing digital certificate, the processor is programmed to:

extract, in response to determining that the existing digital certificate is expired, the serial number value, a subject distinguished name (DN), and a public key from the existing digital certificate;

send the extracted serial number value, subject distinguished name (DN), and public key, and the extended attribute to the certificate server of the issuer of the existing digital certificate;

receive the renewed digital certificate from the certificate server of the issuer of the existing digital certificate, where the renewed digital certificate comprises the new certificate serial number, the subject distinguished name (DN), the public key, and the issuer identifier of the issuer of the existing digital certificate, and the extended attribute storing the serial number value of the existing digital certificate; and designate the renewed digital certificate as valid for asynchronous message processing.

11. The system of claim 7, where, in being programmed to process the message using the renewed digital certificate, the processor is programmed to:

identify the symmetric key encrypted using the existing digital certificate within the message payload of the received message using the issuer identifier of the renewed digital certificate and the serial number value of the existing digital certificate stored within the extended attribute of the renewed digital certificate.

12. The system of claim 7, where the processor is further programmed to:

in response to determining that the symmetric key encrypted using the existing digital certificate in the message payload does not match the issuer identifier of the renewed digital certificate and the serial number value of the existing digital certificate stored within the extended attribute of the renewed digital certificate:
generate an error indicating that the symmetric key encrypted using the existing digital certificate was not found in the message payload.

13. A computer program product comprising a computer readable storage medium including computer readable program code, where the computer readable program code when executed on a computer causes the computer to:

obtain, within an asynchronous messaging environment from a certificate server of an issuer of an existing digital certificate, a renewed digital certificate to replace the existing digital certificate, where the renewed digital certificate comprises a new certificate serial number, an extended attribute that stores a serial number value of the existing digital certificate, and an issuer identifier that matches an issuer identifier of the existing digital certificate;

receive a message with a symmetric key encrypted using the existing digital certificate and identified within the message via the serial number value of the existing digital certificate; and process the message using the renewed digital certificate, the computer readable program code when executed on the computer causing the computer to:
determine whether the symmetric key encrypted using the existing digital certificate in a message payload matches the issuer identifier and the new certificate serial number of the renewed digital certificate;
determine, in response to determining that the symmetric key encrypted using the existing digital certificate in the message payload does not match the issuer identifier and the new certificate serial number of the renewed digital certificate, whether the symmetric key encrypted using the existing digital certificate in the message payload matches the issuer identifier of the renewed digital certificate and the serial number value of the existing digital certificate stored within the extended attribute of the renewed digital certificate; and in response to determining that the symmetric key encrypted using the existing digital certificate in the message payload matches the issuer identifier of the renewed digital certificate and the serial number value of the existing digital certificate stored within the extended attribute of the renewed digital certificate:
validate the renewed digital certificate; and
in response to successful validation of the renewed digital certificate:
decrypt the symmetric key using a private key of the renewed digital certificate;
decrypt the received message payload using the decrypted symmetric key; and
process the decrypted message payload.

14. The computer program product of claim 13, where the existing digital certificate comprises one of an expired digital certificate and a certificate determined to expire within a configured time relative to an expiration date of the existing digital certificate.

15. The computer program product of claim 13, where in causing the computer to obtain, within the asynchronous messaging environment from the certificate server of the issuer of the existing digital certificate, the renewed digital certificate to replace the existing digital certificate, the computer readable program code when executed on the computer causes the computer to:

send, in response to determining that the existing digital certificate is expired, the existing digital certificate to the certificate server of the issuer of the existing digital certificate;

receive the renewed digital certificate from the certificate server of the issuer of the existing digital certificate, where the renewed digital certificate comprises the new certificate serial number, a subject distinguished name (DN), a public key, and the issuer identifier of the issuer of the existing digital certificate, and the extended attribute storing the serial number value of the existing digital certificate; and designate the renewed digital certificate as valid for asynchronous message processing.

16. The computer program product of claim 13, where in causing the computer to obtain, within the asynchronous messaging environment from the certificate server of the issuer of the existing digital certificate, the renewed digital certificate to replace the existing digital certificate, the computer readable program code when executed on the computer causes the computer to:

extract, in response to determining that the existing digital certificate is expired, the serial number value, a subject distinguished name (DN), and a public key from the existing digital certificate;

send the extracted serial number value, subject distinguished name (DN), and public key, and the extended attribute to the certificate server of the issuer of the existing digital certificate;

receive the renewed digital certificate from the certificate server of the issuer of the existing digital certificate, where the renewed digital certificate comprises the new certificate serial number, the subject distinguished name (DN), the public key, and the issuer identifier of the issuer of the existing digital certificate, and the extended attribute storing the serial number value of the existing digital certificate; and designate the renewed digital certificate as valid for asynchronous message processing.

17. The computer program product of claim 13, where, in causing the computer to process the message using the renewed digital certificate, the computer readable program code when executed on the computer causes the computer to:

identify the symmetric key encrypted using the existing digital certificate within the message payload of the received message using the issuer identifier of the renewed digital certificate and the serial number value of the existing digital certificate stored within the extended attribute of the renewed digital certificate.

18. The computer program product of claim 13, where the computer readable program code when executed on the computer further causes the computer to:

in response to determining that the symmetric key encrypted using the existing digital certificate in the message payload does not match the issuer identifier of the renewed digital certificate and the serial number value of the existing digital certificate stored within the extended attribute of the renewed digital certificate:

generate an error indicating that the symmetric key encrypted using the existing digital certificate was not found in the message payload.

* * * * *